United States Patent Office 3,499,036
Patented Mar. 3, 1970

3,499,036
IMINO END-GROUP POLYMERS
Edwin J. Vandenberg, Foulk Woods, Del., assignor to Hercules Incorporated, Wilmington, Del., a corporation of Delaware
No Drawing. Continuation-in-part of application Ser. No. 298,434, July 29, 1963. This application May 25, 1966, Ser. No. 552,719
Int. Cl. C07c *87/20, 87/36;* C08g *33/00*
U.S. Cl. 260—583                      5 Claims

ABSTRACT OF THE DISCLOSURE

Low molecular weight polymers having terminal imino groups are described. The imino-ended polymers are prepared by cleaving high molecular weight polymers of N-substituted cyclic imines with an organo-alkali metal compound such as butyl lithium. By the use of appropriate isolation procedures, unsaturated end groups can be hydrolyzed to give polymeric products with imino groups on both ends of the polymer chain. The imino-ended polymers are particularly useful in chain extension reactions with diisocyanates, diepoxides, polyamines, etc., and for the preparation of cross-linked foamed articles of good mechanical properties.

---

This application is a continuation-in-part of my application Ser. No. 298,434, filed July 29, 1963, and now U.S. Patent No. 3,337,487.

This invention relates to polymers having terminal imino groups and, more particularly, to lower molecular weight imino-ended polymers of N-substituted imines.

Polyimines prepared by the polymerization of monomeric N-substituted cyclic imines are well known. However, these polymers usually do not contain active hydrogen end groups. In high molecular weight polymers, the amount of active hydrogen concentration is so low as to be essentially ineffective as a means of modifying the polymer and in many cases cannot be detected. Obviously, any means by which the active hydrogen content of the polymer molecule can be increased greatly enhances the utility of the polymer.

Low molecular weight, essentially linear polymers, as, for example, polymers having a number average molecular weight ($M_n$) of about 400 to 20,000 with reactive terminal groups are unique materials. Because of their low molecular weight, they are liquids or have very low viscosity above their softening or melting points. This makes it very easy to mix them with chain-extending agents, fillers, antioxidants, light stabilizers, etc., and results in very easy fabrication, even of complex parts. The reactive end groups make it possible to build the molecular weight back up (up to an infinite, cross-linked network, if desirable), during or after fabrication, by reaction with di- or polyfunctional agents to give excellent mechanical properties. Terminal reactive groups are greatly preferred since the polymer chain, after appropriate chain extension, is of maximum value in obtaining good mechanical properties, whereas dangling chain ends or branches would be present if the reactive groups were not terminal and would not contribute to good mechanical properties. Since the actual amount of reaction in the final chain-extending step is very small, there is very little heat of reaction and very little shrinkage, whereas both of these factors would be excessively large if pure monomer were polymerized directly; in fact, so much so that this approach is usually impractical. Because of this low heat of reaction and low shrinkage, large and/or complex parts and articles can be fabricated accurately and without difficulty.

Thus, in accordance with this invention, low molecular weight polymers having imino end groups on both ends of a large number of the polymer molecules can be prepared by cleaving high molecular weight polymers of N-substituted cyclic imines. This cleavage is effected by reacting the polymer with an organo-metallic compound of an alkali metal under certain conditions which will be more fully discussed hereinafter. The low molecular weight imino-ended polymer products of this invention have number average molecular weights of between about 400 and about 20,000, and preferably between about 500 and about 10,000, and are to a large extent double imino-ended, i.e., a large portion (at least about 30%) of the polymer chains have imino groups at both ends thereof.

A preferred method for preparing the low molecular weight polymers of this invention is illustrated by the following equations for the cleavage of an N-methyl ethylene imine and an N-methyl propylene imine polymer with an organolithium compound (LiR), wherein abstraction of hydrogens on a carbon atom beta to the N-substituted imino linkage leads to cleavage. As will be seen, for any given N-substituted imino linkage in the ethylene imine polymer chain there are two positions wherein a hydrogen is attached to a carbon beta to the imino linkage, and hence there are two possible chain cleavage reactions, one involving cleavage on the left side of the imino linkage and one involving cleavage on the right side of the imino linkage. The two cleavage reactions involving these two beta hydrogens ($\beta_1$ and $\beta_2$) are shown below in Equations I and II for two units in the polymer chain, the remainder of the polymer chain being R' and R" in these equations. As also will be seen, for any given imino linkage in the propylene imine polymer chain there are three positions wherein hydrogen is attached to a carbon beta to the imino linkage, and hence there are three possible chain cleavage reactions, two involving cleavage on the left side of the imino linkage and one involving cleavage on the right side of the imino linkage. The three cleavage reactions involving these three beta hydrogens ($\beta_1$, $\beta_2$, and $\beta_3$) are shown below in Equations III and IV for two units in the polymer chain, the remainder of the polymer chain being R' and R" in these equations.

Left Side Cleavage (I)

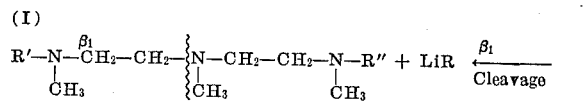

(A)

Right Side Cleavage (II)

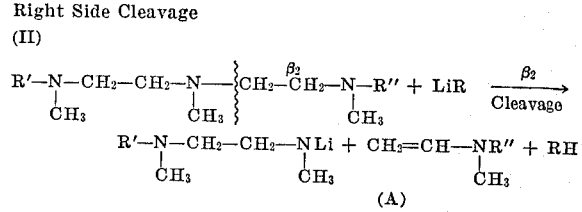

(A)

Left Side Cleavage (III)

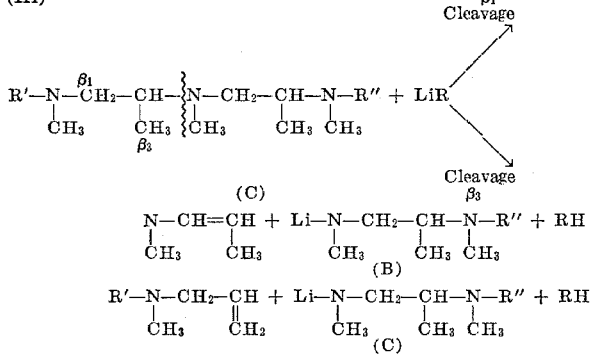

Right Side Cleavage (IV)

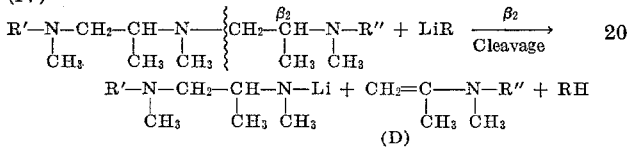

The lithium amide end groups are readily converted by washing with an active hydrogen compound, such as water, acid, alcohol, etc., to imino groups. The vinyl end groups (labeled A above), the propenyl end groups (labeled B above), and the isopropenyl end groups (labeled D above) are very readily converted to an imino end group by acid treatment. The low molecular weight by-product aldehyde (acetaldehyde) and ketone (acetone) are readily water-washed or volatilized out of the product. The allyl end group (labeled C above) would not be removed by mild acid washing as used herein, but surprisingly this type of end group is not found in the cleavage product. Presumably, either the end group isomerizes under the influence of the cleavage agent or the lithium amide product to form a propenyl imino group (B) which is readily removed by acid hydrolysis, or the end group is removed by further cleavage or is displaced by reaction with LiR to form a lithium amide end group which is readily converted to an imino end group.

Following the hydrolysis of the cleaved polymers, the lower molecular weight polymers produced generally are, to a large extent, imino-ended at both ends of the polymer chain. However, other end groups may also be present, i.e., unhydrolyzed double bonds and disubstituted amino groups. Although applicant does not wish to be bound to any particular theory, it is believed that amino groups are present prior to cleavage. Such end groups can be minimized and made negligible by cleaving a high molecular weight polymer.

The conversion of the lithium-ended cleaved product (where R″ is the remainder of the polymer chain) to an imino-ended compound by hydrolysis is illustrated by the following equation:

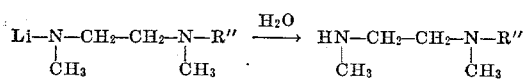

As pointed out above, it is essential that there be at least one hydrogen attached to a carbon beta to the imino group in order for the polymer to be cleaved in accordance with this invention to produce reactive end groups on both ends of the polymer chain. Since a product having imino groups on both ends of the polymer chain is desired, a further requirement is that the polymer being cleaved must be of such a nature that it is possible to isomerize the initially formed double bond end group into conjugation with the imino group to which it is attached. This requires at least one isomerization path to the imino nitrogen atom in which every carbon bears at least one hydrogen atom. Thus, while a polymer which has β hydrogens but otherwise has fully substituted main chain carbons can be cleaved by the process of this invention, and the product will have reactive end groups, it is not always possible to hydrolyze all of the unsaturated end groups so as to produce only polymers with imino groups at both of their ends.

Thus, any N-substituted imine polymer containing monomer units in the polymer chain having at least one hydrogen in the beta position to the imino group can be cleaved to produce a polymer having reactive groups on both ends of the polymer chain. Those polymers having in addition at least one hydrogen on each carbon between the imino group and any double bond formed on cleavage of the polymer can be used to produce the double imino-ended polymers of this invention.

Those polyimines which can be cleaved to produce the double imino-ended lower molecular weight polymers of this invention will contain sequences of at least 2 and preferably at least 5 monomer units having the following general formula:

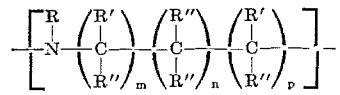

where R is alkyl, alkenyl, cycloalkyl, aryl, aralkyl, alkoxyalkyl, or together with R′ forms a cyclic structure; R′ is H, alkyl, alkenyl, haloalkyl, cycloalkyl, aryl, aralkyl, alkoxyalkyl, aryloxyalkyl, alkenyloxyalkyl, alkenylaryloxyalkyl; each R″ is any one of H, alkyl, alkenyl, alkoxyalkyl, alkenyloxyalkyl, haloalkyl, or alkenylaryloxyalkyl; or any two of R′ and R″ can together form a cyclic structure, at least one of said R′ and R″ groups in each of said monomer units in said sequences providing a hydrogen attached to a carbon in the beta position to each N atom; and m, n, and p are 0 or a whole number of 1 to 4 and the sum of m, n, and p is at least 2. When n is greater than 1, each repeated R″ may be the same as or different from any preceding R″.

Exemplary of the polymers that can be cleaved to produce the products of this invention are the homopolymers and copolymers of N-alkyl and N-alkenyl ethylene imines (i.e., aziridine) such as N-methyl, ethyl, propyl, isopropyl, n-butyl, isobutyl, tert-butyl, n-hexyl, n-octyl, dodecyl, octadecyl, octadecenyl, allyl, etc., ethylene imines, and the corresponding N-alkyl propylene imines, N-alkyl butene-1 imines, cis- and trans-N-alkyl butene-2-imines, N-alkyl isobutylene imines, N-alkyl cyclohexene imines, N-alkyl styrene imines, N-alkyl octadecene-1 imines, N-methoxymethyl ethylene imine, the N-alkyl tetramethyl ethylene imines, N-phenyl ethylene imine, N-tolyl ethylene imine, N-benzyl ethylene imine, N-cyclohexyl propylene imine, etc. Other alkylene imines are the corresponding N-alkyl, -cycloalkyl, and -aryl trimethylene imines, and tetramethylene imines (pyrrolidine), the N-alkyl, -cycloalkyl, and -aryl piperidines, 1-azabicyclo [4·2·0] octane, i.e., conidine, including both the isotactic and atactic polymers, methyl conidine, 6,8-dimethyl conidine, 1,4-diazabicyclo [2·2·2] octane, the N-alkyl 3-azabicyclo [3·2·2] nonane, 7-azabicyclo [2·2·1] heptane, the N-alkyl hexamethylene imines, etc. In addition to the copolymers of any 2 or more of the above monomers, copolymers which contain only part of the above required units can be used provided that these units occur in sequences of at least 2, and preferably at least 5, and the remainder of the polymer is inert to the cleavage reaction. Exemplary of such polymers are graft copolymers such as vinyl alcohol polymers and copolymers, phenol-formaldehyde resins, etc., in which polymers the hydroxyls have been converted to polyimine side chains, and block copolymers such as blocks of hydrocarbon units, polyester units, and polyamide units, or of polyimines which do not have hydrogens beta to the N, combined with blocks of units having the above formula. Such polymers are, for example, poly(vinyl alcohol) and copolymers of vinyl alcohol with ethylene (hydrolyzed vinyl acetate-ethylene copolymers) where each of the hydroxyl groups has been reacted with N-alkyl ethylene imines to give poly(N-alkyl imine) side chains of 5 to 100 monomer units. The analogous products derived from soluble phenol-formaldehyde resins may also be cleaved in the same way as can block copolymers such as copolymers of blocks of styrene with N-methyl ethylene imine blocks, blocks of thioformaldehyde with blocks of N-methyl ethylene imine, etc.

Preferably the polymer that is cleaved will be one of fairly high molecular weight so that the original end groups in the polymer being cleaved are an insignificant portion of the total final end groups. A large portion of the individual polymer molecules in the cleaved product will then have imino end groups on both of their ends. The polymer being cleaved will preferably have a chain of at least about 20 of said monomer groups and more preferably at least about 100. The actual molecular weight of the polymer being cleaved and the number of cleavages per polymer molecule will, of course, depend on the purpose for which the final polymer is to be used. Thus, if a difunctional polymer is desired for chain extension with a difunctional reactant such as a diisocyanate to form a linear high polymer, this would require a very high percentage of polymer molecules having the active imino group on each end, whereas chain extension with a tri- or higher functionality reactant, such as a triisocyanate, to form a cross-linked network would not necessitate that such a high majority of the polymer molecules be double-ended. Also, if more than two reactive groups are introduced per chain, as in the case where side-chain substituents are cleaved, then the percentage of active-ended molecules does not need to be quite as high.

The cleavage process used to produce the polymers of this invention is carried out by reacting the above-described polymers with an organometallic compound of an alkali metal. Any organometallic compound of an alkali metal, i.e., lithium, sodium, potassium, rubidium, or cesium, can be used. The organo moiety will preferably be a hydrocarbon groups, as, for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyllithium, lithium acetylide, methylsodium, ethylsodium, propylsodium, isopropylsodium, the butyl sodiums, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl-, and butylpotassium, allylpotassium, octylpotassium, phenylpotassium, cyclopentylpotassium, cyclohexenylpotassium, etc. The amount of the cleaving compound used will depend upon the amount of cleavage desired, one molecule of the cleaving compound being required for each cleavage, i.e., per two chain ends. Thus, the amount of cleaving compound can vary from about 1% up to a large excess, as, for example, 5 to 10 times the weight of the polymer being cleaved, but preferably will vary from about 1% to about 100% by weight of the polymer being cleaved. If the polymer being cleaved has groups reactive to these cleaving compounds, as, for example, hydroxyl, ester, etc., groups, then the amount of cleaving compound used must be in excess of this requirement.

The cleavage process can be carried out in the absence of a diluent, i.e., a bulk process, but preferably is carried out in a diluent which may be a solvent for the polymer being cleaved or which may serve only as a dispersant for the polymer. Any organic liquid diluent that is inert under the reaction conditions can be used, as, for example, aromatic hydrocarbons such as benzene, toluene, xylene, etc., aliphatic and cycloaliphatic hydrocarbons such as hexane, n-heptane, cyclohexane, etc., and mixtures of such hydrocarbons, as, for example, petroleum ether, gasoline, etc. Diluents that are capable of reaction with the organometallic compound, as, for example, ethers, can also be used provided that the rate of reaction of the organometallic with the polymer being cleaved exceeds the rate of reaction with the diluent. The concentration of the polymer in the diluent can vary from a fraction of 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder, after which the cleaved fluid product can be handled in more conventional equipment in a continuous process.

The cleavage of the polymers of N-substituted imines can be carried out over a wide temperature range, generally from about −80° C. to about 200° C., depending on the reactivity of the polymer and the organometallic compound, the stability of the organometallic compound, etc. Preferably, the reaction is carried out at a temperature of from about −50° C. to about 150° C., and more preferably from about −20° C. to about 120° C. The pressure can be atmospheric, subatmospheric, or above atmospheric, as desired. In fact, pressures up to several thousand pounds can be used if needed to keep the diluent in the liquid state.

Through the use of the above-described cleavage reaction, a polymer having imino groups on both ends of the polymer chain can be obtained, provided the proper isolation procedure is also used. Thus, appropriate isolation conditions must be used to hydrolyze off the double bond or vinylene end groups, i.e., the propenyl, isopropenyl, vinyl, or other vinylene, vinylidene, etc., end groups. This is very readily accomplished in the case of the propenyl or vinyl end groups by simply washing the reaction mixture after the cleavage reaction with a weak or strong acid solution, as, for example, dilute hydrochloric acid, formic acid, acetic acid, oxalic acid, sulfuric acid, sulfurous acid, nitric acid, sulfonic acid, carbonic acid, etc.

The imino chain-end polymers of this invention can have molecular weights of from a few monomer units per molecule up to any desired chain length. In general, they will have a number average molecular weight of from about 400 up to about 20,000, and preferably from about 500 to about 10,000.

The polymer products of this invention are to a large extent double imino-ended. Thus, at least about 30%, preferably at least about 50%, and more preferably at least about 80%, of the polymer chains have imino groups at both ends thereof (i.e., they are double imino-ended chains). The remaining chains contain no imino groups or can be monoimino-ended; however, a low monoimino-ended chain content is preferred. The diimino-ended product is desirably separated out in pure form by chromatography methods, as, for example, by passing the product through an appropriate column of silica, alumina, clays, metal amides, etc., wherein the diimino product is more strongly adsorbed and thus separated from monoimino-ended product. Liquid-liquid counter-current extraction methods can also be used, if desired. The term "polymer" as used herein is intended to cover homopolymers as well as random or block copolymers thereof with a copolymerizable monomer and is also intended to cover terpolymers and interpolymers wherein more than one comonomer is used.

The high molecular weight polyimines that are cleaved to form the low molecular weight imino-ended polymers of this invention can be prepared by any desired means, as, for example, by cationic polymerization. The polymerization is typically carried out by reacting a cyclic imine with an acid catalyst such as a Lewis acid as BF$_3$ at low or elevated temperature.

The following example illustrates the preparation of the imino-ended polymers of this invention. All parts and percentages are by weight unless otherwise indicated, and the example was run under a nitrogen atmosphere. The molecular weight of the polymers is indicated by their reduced specific viscosities (RSV). By the term "reduced specific viscosity" is meant $\eta$sp./C. determined on a 0.1% solution in chloroform at 25° C. The number average molecular weight (Mn) was determined in benzene (heating to dissolve the polymer when necessary) using a Mechrolab osmometer.

EXAMPLE

Five (5) parts of N-n-butylethyleneimine in 33.8 parts of toluene was cooled to −78° C. under nitrogen, and 8.0 ml. of boron trifluoride gas was added initially and then again after 1 hour. After 19 hours at −78° C., the polymerization was stopped by adding 2 parts of anhydrous ethanol. The reaction mixture was washed with 10% aqueous sodium hydroxide and then with water 10 times, and then was stabilized by adding 0.7% 4,4'-thiobis(6-tert-butyl-m-cresol), based on the weight of the polymer. The solvent was removed and the product was dried for 16 hours at 80° C. under vacuum. There was thus obtained 3.6 parts (72% conversion) of a viscous, amber liquid polymer which had an RSV of 0.07. Analysis showed that it contained 13.1% nitrogen (theory for C$_6$H$_{13}$N is 14.1% nitrogen). Infrared analysis showed that the polymer contained less than 0.2% NH groups, and no terminal unsaturation could be detected.

One part of the above polyimine was mixed with 34 parts of n-heptane under nitrogen. After heating on a steam bath and cooling to 30° C., a fraction remained undissolved. While agitating at 30° C., 0.96 part of lithium butyl in 6 parts of n-hexane was added. After 18 hours the reaction was stopped by adding 2.0 parts of anhydrous ethanol. The solvent was stripped off, and the product was dissolved in toluene and washed with water until neutral. A trace of insoluble product was removed, and the soluble material was recovered by stripping off the solvent and drying for 16 hours at 80° C. under vacuum. There was obtained 0.78 part of a fluid, brown liquid with an Mn of 466 (degree of polymerization of about 5). Infrared analysis showed 3.4% NH and that double bonds were present, estimated at about 0.3–0.7% vinyl (calculated as CH$_2$=). The Mn calculated based on the NH groups found and assuming 2 and groups per chain was 880. Thus a large fraction (greater than 30%) of this product has NH end groups (2 per chain) and part has NH and vinyl type end groups.

The foregoing example demonstrates the production of a low molecular weight polyimine having imino end groups at both ends of polymer chain. Thus, this invention provides a ready source of imino-ended polymers which are useful in the preparation of cross-linked, foamed articles of good mechanical properties. The imino-ended products of this invention can also be used in chain extension reactions. The chain-extending agents can be any polyfunctional compound which reacts under appropriate temperature, pressure, and catalyst with secondary amino groups. They can be di- or polyisocyanates such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins, as, for example, the diglycidyl ether of Bisphenol-A; di- or tri-aziridines, as, for example, tris [1-(2-methyl) aziridinyl] phosphine oxide, tris(1-aziridinyl) phosphine oxide; di- or polyanhydrides such as pyromellitic anhydride; or di- or polyimides such as phenylene bismaleimide, etc. The difunctional chain-extending agents are generally used in approximately stoichiometric amounts to the imino chain ends when a linear, soluble high polymer product is desired. When the chain-extending agent contains more than 2 functional groups and is used in approximately stoichiometric amounts to the imino chain ends, the product is generally a cross-linked product. Alternatively, a cross-linked network can be obtained by using a combination of a difunctional imino chain-end polymer with low molecular weight similar poly reactive compounds. Thus, the imines of this invention, having imino groups on both ends of the polymer chain, on combination with a polyol such as glycerin, pentaerythritol, trimethylol propane, sorbitol, tetrakis(2-hydroxypropyl) ethylene diamine, or ethylene oxide or propylene oxide adducts of these polyols in combination with the diisocyanate will yield a cross-linked polyurethane network.

Cross-linked or chain-extended products prepared by the use of the imino-ended polymers of this invention can advantageously include fillers (such as silicas, aluminas, clays, etc.), antioxidants, stabilizers, plasticizers, acid acceptors, and the like.

The imino chain-ended polymers of this invention are also very useful for preparing block copolymers, particularly for the combination of dissimilar blocks, as, for example, the preparation of block copolymers containing blocks of poly(N-alkyl ethylene imine) having >NH groups on each end of the chain, combined with 2 moles of toluene diisocyanate to yield a polymer with the >NH end groups converted to

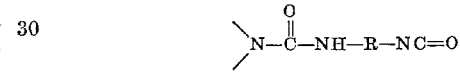

groups, i.e., reactive isocyanate end groups, and this isocyanate-ended product reacted with a diol obtained from poly(propylene oxide), poly(ethylene oxide), poly (octadecene-1 oxide), etc., to yield water- or acid-soluble or dispersible block copolymers useful as flocculating agents, emulsifiers, wetting agents, dry- and wet-strength paper additives, paper size additives, antistatic agents, etc.

The new diimine cleavage products of this invention can also be converted to useful polyamide block copolymers by the usual polyamide forming reactions, using either a simple monomeric unit such as phthalic acid or using preformed polyamides with appropriate reactive chain ends.

The products of this invention are entirely new polyimines with secondary amino groups, i.e., imino groups, at both ends of the polymer chain or with an imino group at one end and an unsaturated group at the other end of the polymer chain.

In the case of a poly(N-cycloalkyl imine) where the cycloalkyl group is attached to the main chain as in poly (conidine) where the monomer unit is

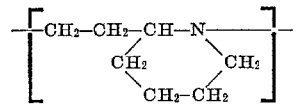

the cleavage yields not only 2 >NH groups per chain, but also 1 carbonyl group per chain, which can be an aldehyde or keto group depending upon which side cleavage occurs. Blocks of these polyimines can be combined, by reaction with diisocyanates, with blocks of a polyether such as poly(ethylene glycol), poly(propylene glycol), poly(octadecenyl glycol), etc., or with polyester, polyamides, polyurethanes, or polyureas, etc., as, for example, hydroxyl or carboxyl terminated polyesters such as poly (ethylene phthalates), poly(ethylene maleates), poly (ethylene adipates), or amine or carboxyl terminated amides such as poly(hexamethylene adipamide), or with diacrylates such as ethylene diacrylate, ethylene dimethacrylate, diacrylamides such as methylene bisacrylamide, etc., to yield high polymers having interesting surface active properties.

The cleavage products having >NH end groups combined with unsaturated end groups, especially where the unsaturated end group is a stable one such as an allyl group, can be used in combination with monomers such as acrylates, methacrylates, maleic anhydride, styrene, etc., which copolymerize with such unsaturated groups to yield polymers useful in reinforced articles with improved properties, particularly because of their improved adhesion to the reinforcing filler, as, for example, glass fiber.

Many other uses of the cleavage products of this invention can be cited. Thus, the imino chain-end polymers can be modified by prereaction with reactive agents such as diisocyanates, diepoxides, dianhydrides, etc., and then reacted with other difunctional or polyfunctional agents such as water, polyols, polyamines, etc., to form useful high polymers. For example, an imino-ended polymer reacted with 1 mole of a diepoxide per imino group yields an epoxide-ended polymer which is useful for modifying epoxide resins. Another example is the reaction of an imino chain end with acrylonitrile to give cyanoethyl end groups which can then be reduced to amino groups and used for subsequent reaction or polymerization. Other applications for these cleavage products will be apparent to those skilled in the art.

What I claim and desire to protect by Letters Patent is:

1. As a composition of matter, an N-substituted imine polymer containing units of the formula

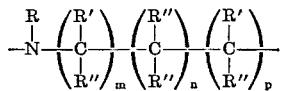

where R is an alkyl, alkenyl, cycloalkyl, aryl, aralkyl or alkoxyalkyl group; R' is R, H, haloalkyl, aryloxyalkyl, alkenyloxyalkyl, alkenylaryloxyalkyl or together with R forms a cyclic structure; R" is H, alkyl, alkenyl, alkoxyalkyl, alkenyloxyalkyl, haloalkyl, alkenylaryloxyalkyl, or together with R' forms a cyclic structure; at least one of the R' or R" groups in each of the units providing a hydrogen attached to carbon in the beta position to each N atom; and $m$, $n$ and $p$ are zero or a whole number of 1 to 4, the sum of $m$, $n$ and $p$ being at least 2, said polymer being characterized by having at least about 30% of the polymer chains double imino-ended and by having a number average molecular weight between about 400 and about 20,000.

2. The composition of claim 1 wherein the N-substituted imine is an N-alkyl alkylene imine.

3. The composition of claim 1 wherein the N-substituted imine is an N-alkyl ethylene imine.

4. The composition of claim 1 wherein the N-substituted imine is N-n-butyl ethylene imine.

5. The composition of claim 4 wherein the number average molecular weight is between about 500 and about 10,000.

References Cited

UNITED STATES PATENTS 3,217,026  11/1965  Vertnik et al.

CHARLES B. PARKER, Primary Examiner

RICHARD L. RAYMOND, Assistant Examiner

U.S. Cl. X.R.

260—79, 79.1, 563, 570.5, 584